June 10, 1952  R. W. FAULHABER  2,600,101
CYCLE SADDLE SUPPORT
Filed Aug. 24, 1946  3 Sheets-Sheet 3
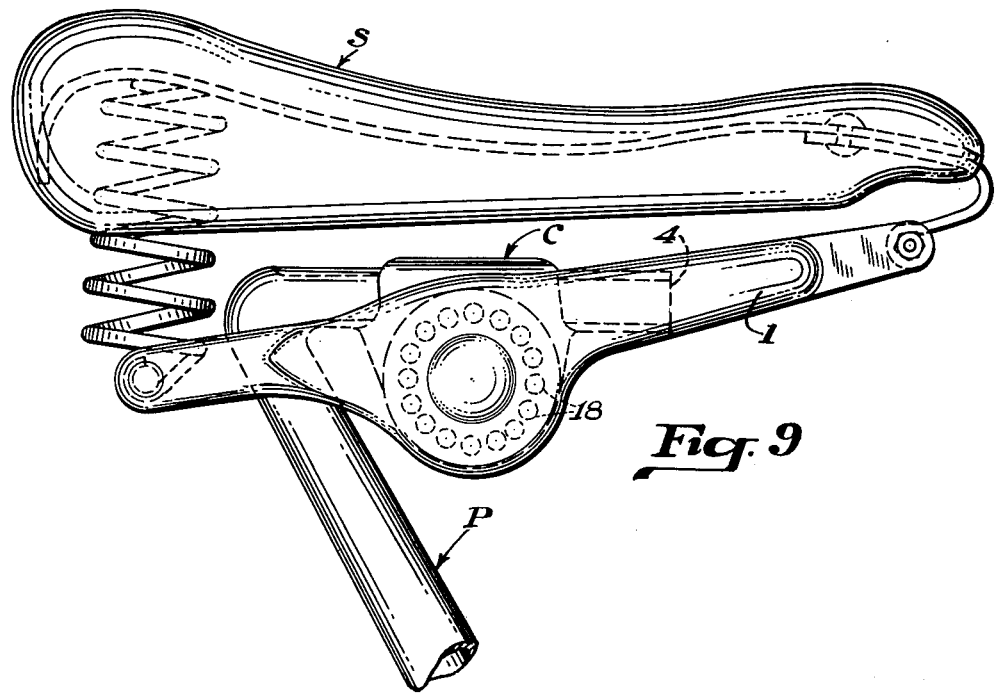
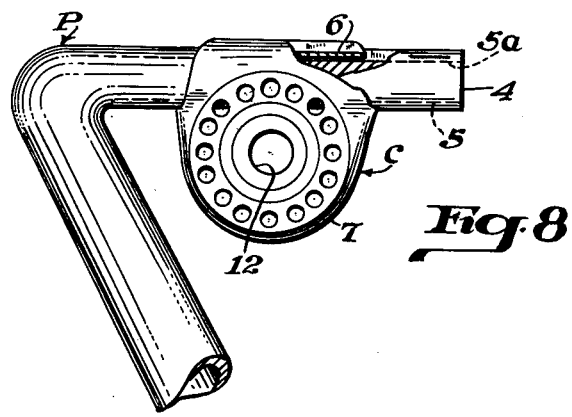
INVENTOR.
ROLAND W. FAULHABER.
BY
ATTORNEYS.

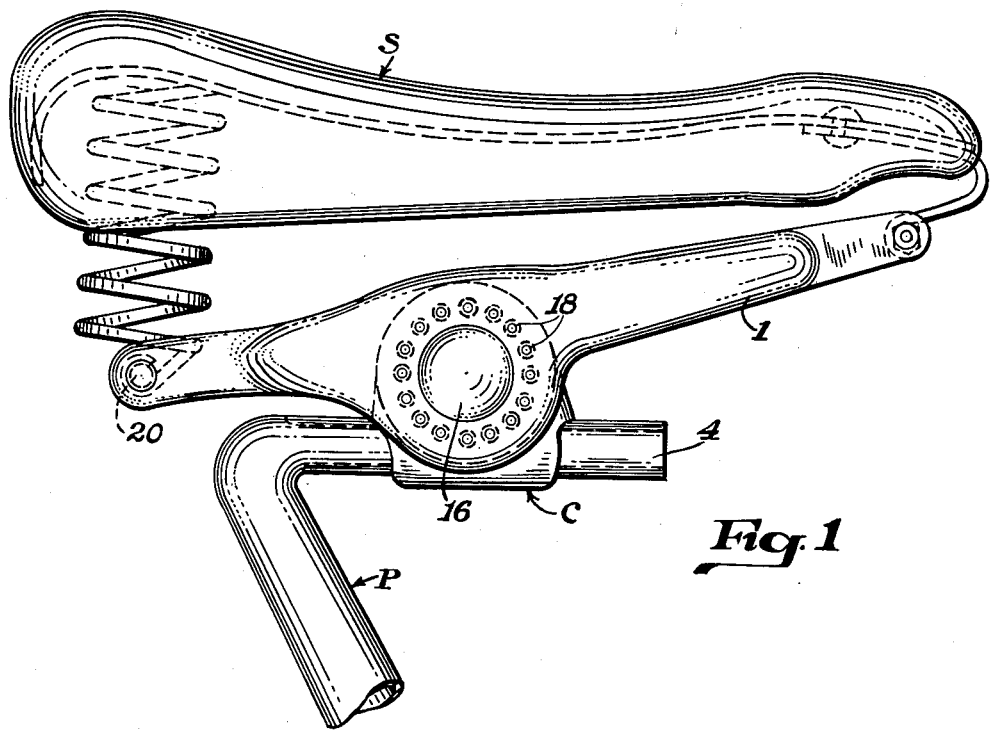
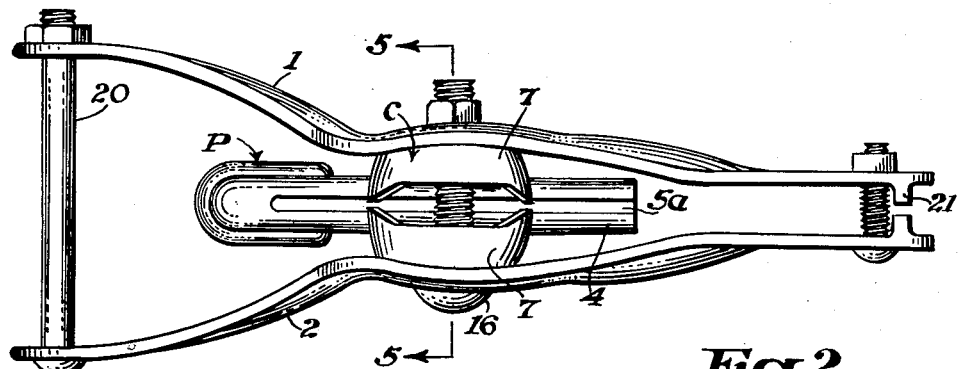

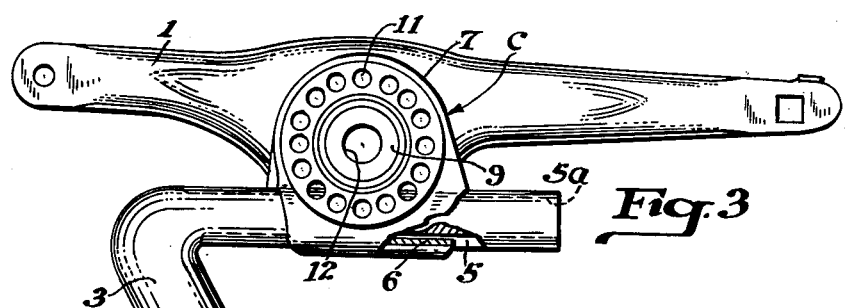
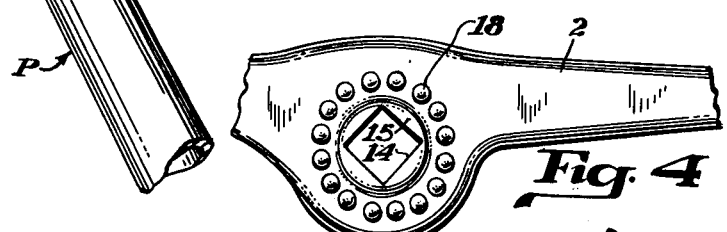
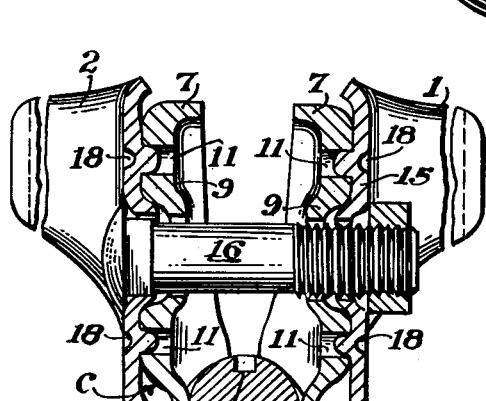
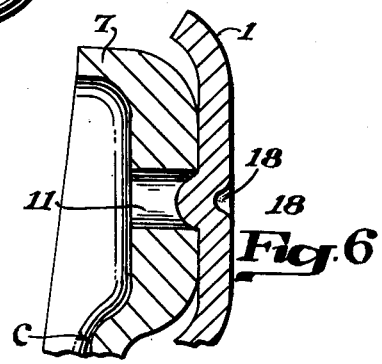
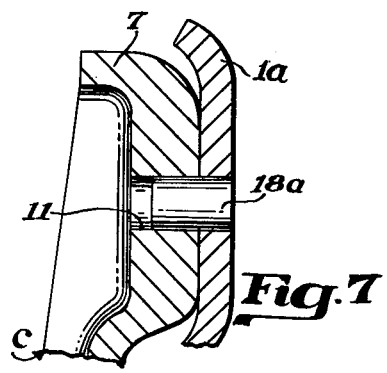

Patented June 10, 1952

2,600,101

UNITED STATES PATENT OFFICE 2,600,101

CYCLE SADDLE SUPPORT

Roland W. Faulhaber, Monroeville, Ohio, assignor to The Faulhaber Company, Monroeville, Ohio, a corporation of Ohio Application August 24, 1946, Serial No. 692,825

1 Claim. (Cl. 155—5.24)

This invention relates to cycle saddles and is specifically directed to an improved arrangement for adjustably mounting a saddle such as that use on a bicycle or motorcycle on the saddle post of the vehicle.

In saddle support constructions found in the prior art, difficulty has been encountered in situations wherein the operator of the vehicle permits the clamping bolt which operates to clamp the adjustable saddle structure to the post to become somewhat loosened. When this occurs there is a tendency for relative motion to occur between the supporting parts under the weight of the operator. Generally, in the prior art friction alone has not been relied upon to assist in retaining the adjustable parts together, it being common to provide intermeshing serrations of V-shaped cross section to aid in securing the parts. When the clamp bolt is loose the serrations tend to move against one another and, due to their wedge-shaped structure, a powerful separating force is exerted and the parts either slip or abrade one another so that the sharp corners are rounded and the effectiveness of the serrations is rapidly destroyed. Accordingly, it is an object of this invention to eliminate tendency of the parts to abrade or deform one another even if the clamping bolt is relatively loose and I accomplish this by providing an interengagement of the parts in which at least one of the elements presents a square corner to the other so that there is no axial separation force due to forces applied by the weight of the operator on the saddle.

Another objection to the serrated structure found in the prior art lies in the fact that to manufacture the heavier constructions extreme pressures are required to form the serrations. It is an object of my invention to reduce the difficulty and work involved in forming the interlocking means and at the same time provide a more effective interlocking means by providing one of the members with a series of punched or drilled holes into which fits a series of projections readily punched out from the mating member, the arrangement being such that relatively little or no axial separating pressure results from force tending to rotate the parts against one another. These and other objects of my invention will be apparent to those skilled in the art as the following detailed description proceeds:

In the drawings:

Fig. 1 is a side elevation of a mounted saddle;

Fig. 2 is a top view of the structure with the seat member and its mounting springs removed;

Fig. 3 is a side elevation of the structure with the seat removed and with one of the side reaches removed to show the clamp in place;

Fig. 4 is an inside view of the side reach removed from the structure shown in Fig. 3;

Fig. 5 is a section taken on 5—5 of Fig. 2;

Fig. 6 is an enlarged partial section taken through the interlocking means showing the preferred form;

Fig. 7 is a similar section showing a modified form;

Fig. 8 shows the clamp itself mounted in an inverted position on the post; and

Fig. 9 shows the assembled saddle in its inverted position.

In Fig. 1 the seat S, which may be of conventional design, may be mounted on the seat support or reach members by means of a coil spring and a leaf spring in accordance with conventional practice, the seat mounting forming no part of this invention. The bent seat support bar P has an inclined leg 3 for mounting in the vehicle post and a generally horizontal leg 4 that mounts a clamp member C. Member C clamps to the leg 4 and supports a pair of saddle support or reach members by means of the novel structure hereinafter to be described. One longitudinally extending reach member 1 is visible in Fig. 1.

As seen in Fig. 2, there are a pair of reach members numbered 1 and 2 which are retained on the clamp C by the bolt 16, which bolt also brings the two ears 7 of the clamp together to grip the extension leg 4 of the post P. Bolts 20 and 21 or other structure may be provided to mount the various springs to support the seat.

Fig. 3 shows the clamp with a bolt and reach member 2 removed. Here can be seen the aperture 12 in the clamp for the bolt and one set of apertures 11 in a clamp ear 7 for mounting one reach member, which apertures may be formed by punching or drilling operations. It can also be seen that the lower portion of the clamp is formed with a tongue 6 which cooperates with a groove 5 in the post leg 4 to prevent rotation of the clamp about the post even if the bolt is loose.

In Fig. 4 the reach member 2 is shown which may have a square aperture 14 to receive the head of carriage bolt. The aperture is formed in a dished part 15 and a series of projections 18 are integral with reach 2 for cooperation with apertures 11 in the clamp arm.

In the section shown in Fig. 5 the tongue 6, which may be pressed up from the clamp, is shown engaging the groove 5 of leg 4 on the support bar. An upper groove 5a may also be provided in order that the clamp may be mounted with the bolt below arm 4. The figure shows how the bolt 16 clamps the reach members 1 and 2 against the ear 7 of the clamp C, which ears in turn grip the post leg 4. The dished portion 9 of each clamp ear receives and nests with a similarly dished portion 15 on each reach member to provide a load supporting and centering arrangement. The figure clearly shows how the male projections 18 fit into the apertures 11 in the clamp ears.

In Fig. 6 an enlarged view of the interengagement of the projections 18 on the reach member and the aperture 11 in the clamp is shown. I prefer to form the projections 18 by partially punching out the metal of the reach member. This provides a shoulder which is almost square for cooperation with the edge of the aperture 11 and since aperture 11 does provide a square shoulder, it is not necessary that the entire wall or projection 18 be cylindrical.

Fig. 7 shows a modified form wherein pins 18a are pressed or welded into the reach member 1a for cooperation with aperture 11, this being a modified form.

In order to provide a wide range of adjustment, I may reverse the clamp C so that the ears 7 are below the leg 4 in which case the tongue 6 engages the upper groove 5a in the leg 4. This permits the seat to be mounted lower as shown in the assembled view in Fig. 9 and the spring mounting of the seat is arranged to provide ample clearance.

Although I have shown the male portions 18 of the assembly punched from or otherwise mounted on the reach members, I contemplate that the parts could be reversed and the apertures formed in the reach members, the male members being provided in or carried by the clamp ears 7. The essence of my invention lies in providing a construction which will have no tendency to wedge the parts axially in response to pressure from the weight of the occupant of the vehicle, this result being obtained by engagement between parts which provide sharp corners. It can also be seen that regardless of the position of the clamp member on the post there is no tendency for the entire seat to slip sidewise due to rotation of the clamp about the leg 4, this desirable result being obtained by the provision of the tongue 6 and the grooves 5 and 5a. Thus, even though the bolt 16 becomes somewhat loose, the parts will maintain their adjusted position and there will be no relative motion of the parts tending to destroy them or mutilate them so that they will require replacement.

Having thus described the present invention so that others skilled in the art may be able to understand and practice the same, I state that what I desire to secure by Letters Patent is defined in what is claimed.

What I claim is:

In a saddle construction a seat support bar having a generally horizontal leg and a leg inclined thereto for mounting in a seat post member, diametrically opposed longitudinally extending guide means formed on said horizontal leg, a U-shaped clamp having a base portion for gripping said horizontal leg, said base portion being formed with guide means for cooperating with either of the guide means on said leg to prevent rotation of said clamp about said leg, said clamp having a pair of reach support members extending from the base portion thereof, a reach member supported by each of said reach support members, one of said last named members having a series of circularly disposed projections and the other of said members having a series of circularly disposed apertures to receive said projections, and means to simultaneously clamp said reach members to said clamp and the base portion of said clamp to said horizontal leg with said clamp guide means engaging one of said guide means on said leg.

ROLAND W. FAULHABER.

REFERENCES CITED

The following references are of record in the file of this patent:

UNITED STATES PATENTS

| Number | Name | Date |
|---|---|---|
| 597,055 | Devore | Jan. 11, 1898 |
| 1,391,409 | Roberts | Sept. 20, 1921 |
| 2,062,592 | May | Dec. 1, 1936 |
| 2,174,340 | Werner | Sept. 26, 1939 |
| 2,231,654 | Bloomberg | Feb. 11, 1941 |
| 2,286,138 | Kalter | June 9, 1942 |
| 2,306,334 | Costas | Dec. 22, 1942 |
| 2,374,809 | Faulhaber | May 1, 1945 |

FOREIGN PATENTS

| Number | Country | Date |
|---|---|---|
| 825,497 | France | of 1937 |
| 178,005 | Germany | of 1905 |